United States Patent
Clark et al.

(10) Patent No.: US 6,944,713 B2
(45) Date of Patent: Sep. 13, 2005

(54) LOW POWER SET ASSOCIATIVE CACHE

(75) Inventors: Lawrence T. Clark, Phoenix, AZ (US); Jay B. Miller, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 10/174,668

(22) Filed: Jun. 18, 2002

(65) Prior Publication Data

US 2003/0233520 A1 Dec. 18, 2003

(51) Int. Cl.[7] .............................................. G06F 12/00
(52) U.S. Cl. ..................... 711/128; 711/113; 711/118; 711/136
(58) Field of Search ................................ 711/113, 118, 711/128, 136, 127, 167

(56) References Cited

U.S. PATENT DOCUMENTS

| 5,559,986 | A | | 9/1996 | Alpert et al. | |
|---|---|---|---|---|---|
| 5,715,426 | A | * | 2/1998 | Takahashi et al. | 711/128 |
| 6,389,523 | B1 | * | 5/2002 | Shimazaki et al. | 711/167 |
| 6,594,728 | B1 | * | 7/2003 | Yeager | 711/127 |
| 6,601,154 | B2 | * | 7/2003 | Shimazaki et al. | 711/167 |
| 6,687,789 | B1 | * | 2/2004 | Keller et al. | 711/128 |
| 6,718,439 | B1 | * | 4/2004 | Jayavant | 711/136 |

FOREIGN PATENT DOCUMENTS

EP       0 330 007 A2    8/1989

OTHER PUBLICATIONS

Hollenbeck et al: "PA700LC integrates cache for cost/performance" Digest of papers of Compcon., Los Alamitos, IEEE Comp. Soc. Press. 1996. pp. 170.*

Dave Hollenbeck et al, PA7300LC Intergrates Cache for Cost/Performance, Feb. 25, 1996 IEEE, pp. 167–174, XP010160890.

Richard E. Matick, Functional cache chip for improved system parformance, Jan. 1989, pp. 15–31, XP000050855.

* cited by examiner

*Primary Examiner*—T. Nguyen
(74) *Attorney, Agent, or Firm*—Lanny L. Parker

(57) ABSTRACT

A processor having an L1 cache memory that may use a compare circuit to determine matches of stored tag information against an address and gate sense amps of the cache memory with a cache-hit signal.

13 Claims, 3 Drawing Sheets

LOW POWER SET ASSOCIATIVE CACHE

The architecture of microprocessors generally includes at least one Static Random Access Memory (SRAM) internal cache that provides high-speed data accesses, with the cache closest to the register file often called a Level 1 (L1) cache. Memory caching in a computer system is effective because most programs exhibit spatial and temporal locality for both data and instructions. By keeping as much of this information as possible in the high-speed SRAM L1 cache, the microprocessor avoids accessing slower external memory. The internal cache may be partitioned into smaller "banks" and methods devised to assert less word lines or fire fewer sense amplifiers in order to reduce power. However, some operations such as line fills and evicts that require wider accesses than typically occurring loads and stores may be hindered by such a cache organization.

The computer system may also use virtually addressed caches and associative schemes in order to reduce power, but still meet the memory requirements of a high-speed processor. For instance, N-way set associative caches may use the cache-hit signal to control the multiplexer that propagates the data being read from the selected way. Although this technique provides a low latency for cache-hits, power may be wasted in the sense amps as all ways of the data array for the selected set are read. Alternatively, the tag may be read during one cycle and used to select the proper way for reading in the next cycle. This technique may reduce power, but the increased latency may not be acceptable on a low level cache. Consequently, this scheme has been used for Level 2 and Level 3 caches.

Accordingly, there is a continuing need for a cache organization that reduces latency and lowers the power of the microprocessor, while not interfering with wide accesses such as line evicts and fills.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
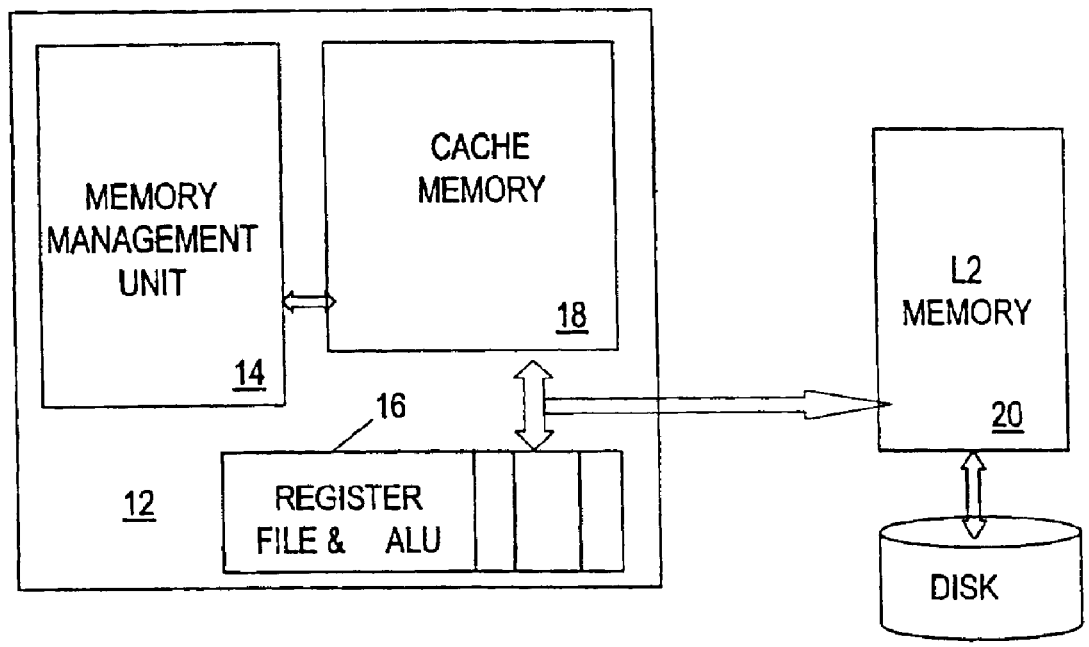
FIG. 1 illustrates a computer system having an N-way set associative cache.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the present invention may be used in a variety of applications. The circuits disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples. Although the present invention is not limited in this respect, any number of Operating Systems (OSs) such as Windows 95™, Windows 98™, and Windows NT™ from Microsoft Corporation in Redmond, Wash. or UNIX™ from Bell Labs, may manage the physical memory present on the controller or processor.

The present invention may also be included or embedded into an integrated circuit, and in general, the embodiments may combine internal cache memory with external main memory and be incorporated into next generation smart phones, communicators and Personal Digital Assistants (PDAs), base band and application processors, platform OS based devices, digital cameras, audio & video decoding, automotive infotainment, set top box and other products.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates a computer system 10 having an Operating System (OS) that may manage the limited physical memory present on the computer, dividing the physical memory among many processes that may be running simultaneously and allocating each process an appropriate memory share. The OS running on a microprocessor 12 may rely on hardware support from a Memory Management Unit (MMU) 14 to manage the memory and export functions that other subsystems and applications may use to interact with the memory. An L1 cache 18 may have a virtual memory address space, with the size of the address space defined by the number of bytes and the number of bits in each byte.

It is desired that most of microprocessor 12 memory accesses come from the L1 cache, because the L1 cache operates at the processor frequency. Thus, the memory caching in computer system 10 utilizes an L1 internal cache 18 to reduce the number of times that microprocessor 12 accesses the L2 "off-chip" or external main memory 20. An L1 cache miss may cause processor 12 to go to the L2 memory or main memory 20, potentially stalling the processor while waiting many instructions worth of time for a read from that memory to complete. The data from logical operations performed in an Arithmetic Logic Unit (ALU) 16 in microprocessor 12 may be stored in cache 18 and/or memory 20.

Generally, the L1 internal cache 18 may be high-speed Static Random Access Memory (SRAM) while the L2 memory and main memory 20 may be a slower Dynamic Random Access Memory (DRAM), although the type of memory is not a limitation of the claimed subject matter. Internal cache 18 may be virtually indexed, and an N-Way set associative cache, although a distinction between a virtual cache and a physical cache is not pertinent to the organization and features of the present invention.

Figure 2:
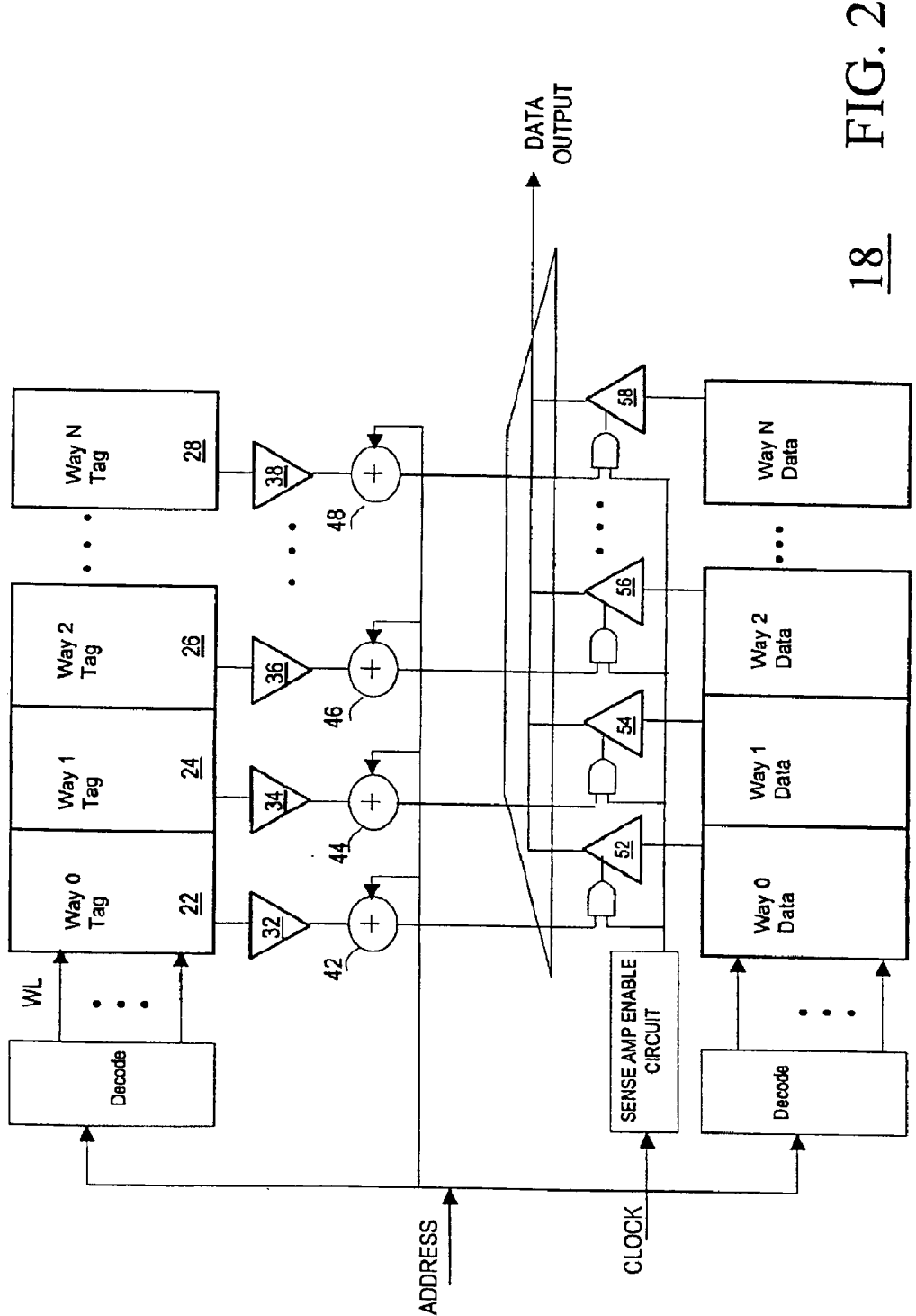
FIG. 2 is a block diagram of the cache illustrated in FIG. 1.

FIG. 2 illustrates L1 hardware cache 18 in accordance with the present invention. The N Way set associatively of cache 18 allows an access of up to N different memory regions that overlap the same cache memory without overwriting the previously cached data. As such, cache 18 includes Way 0, e.g. array 22, Way 1, e.g. array 24, Way 2, e.g. array 26, ..., and Way N, e.g. array 28, for storing the tag portion of the address. Sense amps 32, 34, 36, ..., and 38 may sense the virtual tag information stored in respective arrays 22, 24, 26, ..., and 28. Note that neither the number of Ways in cache 18 nor the size of the array should be considered as limiting the scope of the present invention. In general, the address supplied to cache 18 may be numbered, for example, from bit 0 to 31, where 0 represents the least significant bit (or lower bit) and 31 represents the most significant bit (or higher bit). With this organization, the address may have an "index" portion, a "set" portion and a "tag" portion. By way of example, the low-order 5 bits may provide the "index" portion, the eight bits [12:5] may provide the "set" portion and the nineteen bits [31:13] may provide the "tag" portion. Although this example provides a 32-bit address and the address partitioning of tag [31:13], set [12:5] and index [4:0], it should be pointed out that a different partitioning and even a different number of bits in the address may be used. Thus, it is intended that neither the grouping of bits nor the number of bits is intended to limit the scope of the claims.

In one embodiment, an address [31:0] supplied to L1 internal cache 18 may use bits [12:5] of the address, for example, to select one cache line from among 256 cache lines in each of the Way arrays. Note that the address may be "virtual" or may be "physical", i.e., already translated via the microprocessor MMU 14. The tag information stored at the selected cache line in Way 0, Way 1, Way 2, ..., Way N may be sensed by the respective sense amps 32, 34, 36, ..., and 38. Compare circuits 42, 44, 46 and 48 receive the sensed tags and provide comparisons against bits [31:13] of the address. When a compare circuit indicates a match, i.e., a cache-hit, the data information from the appropriate Way is combined with the appropriate data array sense amplifier enable timing signal to fire only the sense amplifiers 52, 54, 56 or 58 that correspond to the matched Way. In this manner, only M sense amplifiers (where M is the data width) dissipate power for the selected Way. Alternatively, it should be noted that either Domino CMOS gates or wire-or'ed output path may automatically select the data. If none of the tags in cache 18 match the tag portion of the address, then there is a data cache miss. Note that the L1 cache sense amplifiers and the data delivery path dissipate no power in this case.

Selector 60 includes sets of cache sense amps 52, 54, 56 and 58 that receive the tags from the corresponding Way arrays, but in accordance with the present invention, only one set of cache sense amps is enabled to pass data to the output. By way of example, a tag stored at a selected cache line in Way 0 is sensed by sense amps 32, compared by compare circuit 42 against the tag portion of the address, and cache data is passed by the set of data sense amps 52 to the data output if compare circuit 42 indicates a cache-hit. Again, note that the operating power of cache 18 may be reduced by using the compare circuits to enable only one Way of data sense amps, while disabling the remaining sets of data sense amps.

Figure 3:
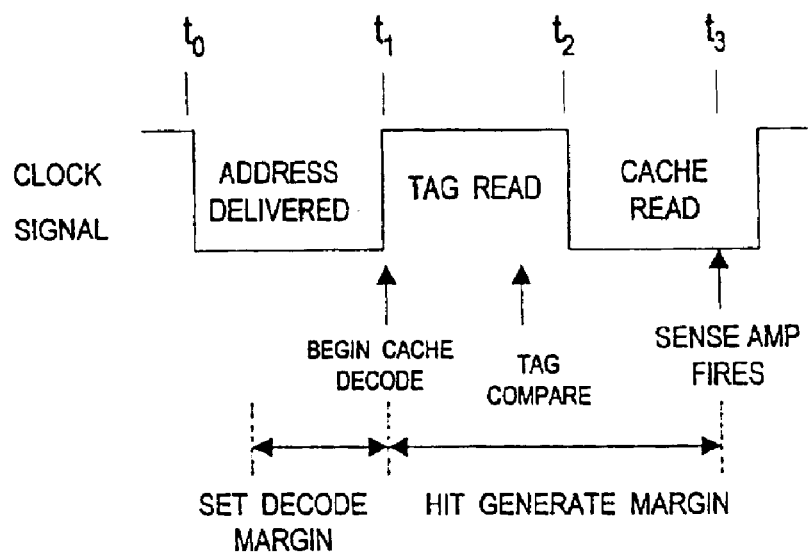
FIG. 3 is a diagram that describes the timing for the cache in accordance with the present invention.

FIG. 3 is a diagram that describes the timing for cache 18 in accordance with the present invention. The generation of the address may occur at the falling edge of the clock, i.e., at time $t_0$. During the time $t_1$ to $t_2$, the tag stored at a selected cache line in a Way array is sensed and compared by the compare circuits against the tag portion of the address. If the compare circuits indicate a cache-hit for one of the Ways, the cache-hit signal is supplied to the cache sense amps following the rising edge, at time $t_1$, of the clock. The appropriate cache sense amps are enabled in selector 60 and the data supplied to the data output following time $t_3$.

Figure 4:
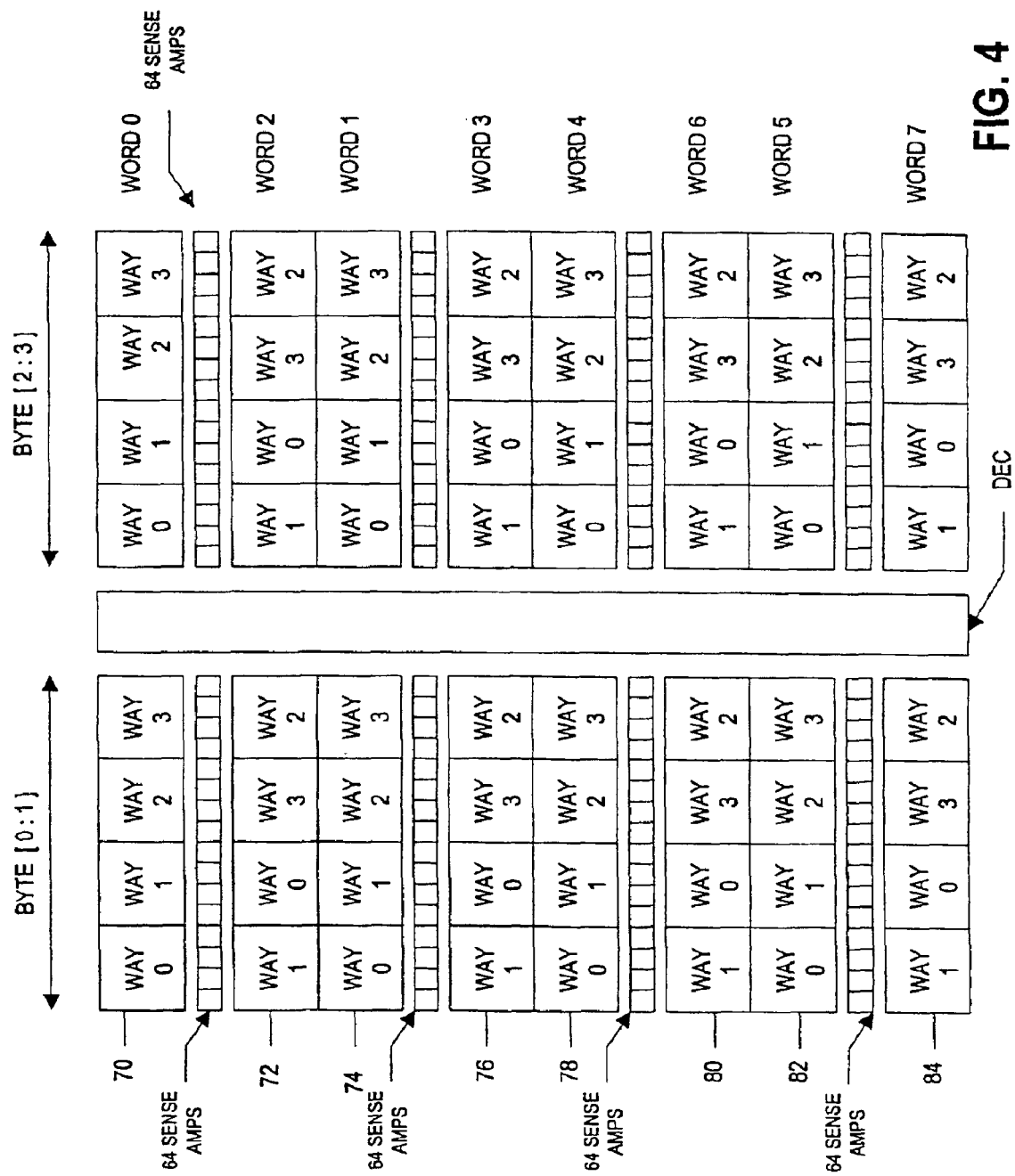
FIG. 4 is a block diagram of a physical arrangement of the cache memory of FIG. 1 in accordance with the present invention.

FIG. 4 illustrates a cache memory organization to reduce latency between the lowest level cache and the next higher-level cache. The performance of computer system 10 (FIG. 1) may correlate with the number of cycles used to pass data between levels of cache. Any reduction in the number of these cycles may reduce stalls. While accesses between the L1 cache and the microprocessor core is typically one to two words, larger groupings, for example, of four to sixteen words (referred to as a "line") may be preferred in communications between cache levels. In this embodiment, the organization of the Ways and the physical arrangement of the words in the cache memory may improve system performance by allowing a single cycle line size write and a single cycle line size read (eviction) without an inordinate number of sense amps. Note that reducing the number of sense amps lowers the idle current component for handheld and other low power applications.

This embodiment shows a 4-way set associative cache, but the size of the cache and the number of Ways should not be a limitation of the present invention. As shown, the cache may be divided into blocks 70–84, with each block having four Ways, i.e., Way 0, Way 1, Way 2 and Way 3. Each of the four Ways may contain four bytes (a byte represents 8 bits) for storing a 32-bit word. Way 0, Way 1, Way 2 and Way 3 in each block may be partitioned into a lower portion to store the lower two bytes and an upper portion to store the upper two bytes. By way of example, a Way 0 in block 70 may store the lower two bytes (denoted by Bytes [0:1], e.g. bits 0:15) and another Way 0 may store the upper two bytes (denoted by Bytes [2:3], e.g. bits 16:31 ).

Also, the words may be physical arranged in the cache as WORD 0 (block 70), WORD 2 (block 72), WORD 1 (block 74), WORD 3 (block 76), WORD 4 (block 78), WORD 6 (block 80), WORD 5 (block 82), and WORD 7 (block 84). Further note that 64 sense amps may be located between WORD 0 and WORD 2, 64 sense amps may be located between WORD 1 and WORD 3, 64 sense amps may be located between WORD 4 and WORD 6, and 64 sense amps may be located between WORD 5 and WORD 7.

In this embodiment, half of the WORDS may be arranged having the Ways ordered consecutively, while in the other half the pair ordering of the Ways may be reversed. Put another way, WORD 0, WORD 1, WORD 4 and WORD 5 may be arranged to have a physical order of Way 0, Way 1, Way 2 and Way 3 for storing the lower two bytes and the same ordering for storing the upper two bytes. But WORD 2, WORD 3, WORD 6 and WORD 7 may be arranged with the Ways having a different ordering. In these WORDS, the pair ordering may be reversed to have a physical order of Way 1, Way 0, Way 3, Way 2 for storing the lower two bytes and the same ordering for storing the upper two bytes. This arrangement of the cache memory allows Way 0 to share sense amps with Way 1, and Way 2 to share sense amps with Way 3. As one example, the lower two bytes (Bytes [0:1]) and the upper two bytes (Bytes [2:3]) for Way 0 of block 70 may be arranged to share sense amps with the corresponding lower two bytes and upper two bytes for Way 1 of block 72. Likewise, the lower two bytes (Bytes [0:1]) and the upper two bytes (Bytes [2:3]) for Way 1 of block 70 may be arranged to share sense amps with the corresponding lower two bytes and upper two bytes for Way 0 of block 72. Similarly, the lower two bytes (Bytes [0:1]) and the upper two bytes (Bytes [2:3]) for Way 2 of block 70 may be arranged to share sense amps with the corresponding lower two bytes and upper two bytes for Way 3 of block 72, and the lower two bytes (Bytes [0:1]) and the upper two bytes (Bytes [2:3]) for Way 3 of block 70 may be arranged to share sense amps with the corresponding lower two bytes and upper two bytes for Way 2 of block 72.

Sense amps may be used for sensing the value of each stored bit. During normal operation where one 32-bit word is read, one sense amp enable signal may be asserted that allows one of the four sense amps associated with each I/O bit slice to actively sense information. But during an eviction, two sense amp enable signals may be asserted and allow two sense amps from the group of four to be active. In this case, bit 0 from WORD 0 and bit 0 from WORD 2, for example, may be read for the same Way. By not grouping words together in the same cache block, the present organization enables one-cycle evictions, activating two hundred and fifty six sense amps that allow eight words to be read at the same time. Also, this cache organization allows the power to be distributed evenly across the entire cache array during an evict or fill. Note that the sense amps may be gated by the cache-hit signal from a tag stored in one of the Ways, and hence, no "late way" select circuit exists.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A memory that includes consecutively ordered first, second, third and fourth Ways in a first WORD and a reverse pair ordering in a second WORD.

2. The memory of claim 1 wherein the memory is an N-way set associative cache having an ordering of the first Way followed by the second Way and the third Way followed by the fourth Way in the first WORD and an ordering of the second Way followed by the first Way and the fourth Way followed by the third Way in the second WORD.

3. The memory of claim 1 wherein left and right halves of each WORD are commonly controlled for a full cache line read.

4. The memory of claim 3, wherein the-ordering of the first Way followed by the second Way in a first WORD is the same on the left and right halves of each WORD.

5. A cache memory comprising:

a horizontal ordering of a first Way, a second Way, a third Way and a fourth Way in a first addressble WORD and a reverse pair order in a second addressable WORD that has a sequential ordering of the second Way, the first Way, the fourth Way and the third Way.

6. The cache memory of claim 5 wherein a binary decoding of row addresses provides an order of a Word 0, then a Word 1, then a Word 2 and a Word 3, but a physical organization of the cache memory arranges Word 0 and Word 2 to share first sense amps and Word 1 and Word 3 to share second sense amps.

7. The cache memory of claim 5 wherein the cache memory enables eight words to be read in providing one-cycle evictions.

8. An apparatus, comprising:

a cache having consecutively ordered first, second, third and fourth Ways in a first WORD and a reverse pair ordering in a second WORD; and sense amps to pass data stored in the first Way in the first WORD and data stored in the first Way of the second WORD to an output, and further pass data stored in the second Way in the first WORD and data stored in the second WAY of the second WORD to the output.

9. The apparatus of claim 8 wherein the third and fourth Ways have an ordering of the third Way followed by the fourth Way in the first WORD and the fourth Way followed the third Way in the second WORD.

10. The apparatus of claim 8 further including first and second compare circuits coupled to receive an address, the first compare circuit further coupled to receive data stored in the first Way and generate the first cache-hit signal and the second compare circuit coupled to receive data stored in the second Way and generate the second cache-hit signal.

11. A method comprising:

arranging first, second, third and fourth Ways in a consecutive order in a first WORD and changing an order in a second WORD to the second Way, the first Way, the fourth Way and the third Way.

12. The method of claim 11 further including:

dedicating first sense amps to read data stored in the first Way of the first WORD and read data stored in the second Way of the second WORD.

13. The method of claim 12, further including:

dedicating second sense amps to read data stored in the second Way of the first WORD and read data stored in the first Way of the second WORD.

* * * * *